United States Patent [19]

Saito et al.

[11] 4,136,227

[45] Jan. 23, 1979

[54] ELECTRODE OF DISCHARGE LAMP

[75] Inventors: Masato Saito; Keiji Watanabe; Keiji Fukuyama, all of Kamakura, Japan

[73] Assignee: Mitsubishi Denki Kabushiki Kaisha, Tokyo, Japan

[21] Appl. No.: 852,498

[22] Filed: Nov. 17, 1977

[30] Foreign Application Priority Data

Nov. 30, 1976 [JP] Japan ................................ 51-144337

[51] Int. Cl.[2] .......................... H01G 1/01; H01J 1/14; H01J 1/30

[52] U.S. Cl. .................................... 428/389; 313/218; 313/311; 313/346 R; 427/77; 427/111; 427/126; 428/472; 428/539

[58] Field of Search ................... 313/218, 311, 346 R; 427/126, 77, 78, 111; 428/539, 389, 378, 472

[56] References Cited

U.S. PATENT DOCUMENTS

| | | | |
|---|---|---|---|
| 3,170,772 | 2/1965 | Sato et al. | 29/183.5 |
| 3,227,905 | 1/1966 | Talcott | 313/311 X |
| 3,558,966 | 1/1971 | Hill | 313/311 X |
| 3,719,856 | 3/1973 | Koppius | 313/311 X |
| 3,742,282 | 6/1973 | Siegle | 313/311 |
| 3,919,581 | 11/1975 | Datta | 313/311 X |
| 3,922,428 | 11/1975 | Cronin | 313/311 |
| 4,052,634 | 10/1977 | De Kok | 313/218 |
| 4,082,906 | 4/1978 | Amin et al. | 428/539 |

*Primary Examiner*—Harold Ansher
*Attorney, Agent, or Firm*—Oblon, Fisher, Spivak, McClelland & Maier

[57] ABSTRACT

An electrode of a high pressure metal-vapor lamp such as a high pressure mercury-vapor lamp including mercury and rare-gas and a high pressure sodium-vapor lamp including mercury, rare-gas and sodium, is disclosed.

The electrode has an improved electron emission material containing beryllium oxide and yttrium oxide coated on the substrate of the electrode whereby the electron emission material is uniformly coated to form an electron emission material layer which is firmly bonded and the starting characteristic is excellent and the lumen maintenance is excellent.

4 Claims, 3 Drawing Figures

ELECTRODE OF DISCHARGE LAMP

BACKGROUND OF THE INVENTION

The present invention relates to an electrode coated with an improved electron emission material for discharge lamp.

It has been known to use a mixture of barium oxide (BaO), calcium oxide (CaO) and yttrium oxide ($Y_2O_3$) or a mixture of yttrium oxide and barium tungstate ($Ba_3WO_6$) or barium-strontium-calcium tungstate ($Ba_{2-x}Sr_xCaWO_6$) (x = 0 to 0.5) as the electron emission material coated on the electrode of the discharge lamp such as a high pressure metal-vapor lamp e.g. a high pressure mercury-vapor lamp.

However, the electron emission material containing yttrium oxide as heat-resistant oxide usually has a disadvantage of weak adhesion to the substrate of the electrode. During operation, a part of electron emission material is peeled off whereby it causes the sudden decrease of the lumen maintenance and the rise of the starting voltage to render the lamp inoperative.

In order to overcome the disadvantage, it has been proposed to improve the adhesion of the electron emission material on the substrate of the electrode by the addition of a small amount of silicon oxide ($SiO_2$), zirconium oxide ($ZrO_2$), aluminum oxide ($Al_2O_3$), etc. The adhesion may be slightly improved by these addition, however, the cause of the short-life of the discharge lamp could not be substantially eliminated.

SUMMARY OF THE INVENTION

It is an object of the present invention to overcome the disadvantages of the conventional electrode of a discharge lamp by improving adhesion of an electron emission material on the substrate of the electrode.

It is another object of the present invention to provide a discharge lamp having a long life.

The foregoing and other objects of the present invention have been attained by providing an electrode of a discharge lamp which is coated with an electron emission material comprising both of beryllium oxide and yttrium oxide as the heat-resistant oxides.

When both of beryllium oxide and yttrium oxide are incorporated as the heat-resistant oxide, the adhesion of the electron emission material on the substrate of the electrode is remarkably improved whereby the life of the discharge lamp is remarkably prolonged. That is, when beryllium oxide is incorporated together with yttrium oxide in the electron emission material, the adhesion of the electron emission material to the substrate of the electrode is remarkably improved and the starting voltage before the life test of the lamp is lowered and the rise of the starting voltage during operation test is small.

DETAILED DESCRIPTION OF THE PREFERRED EMBODIMENTS

Figure 1:
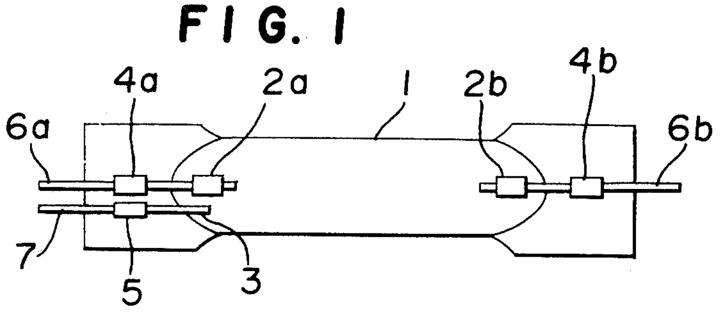
FIG. 1 is a schematic view of one embodiment of a discharge lamp having an electrode of the present invention.

Referring to FIG. 1, the structure of a quartz arc tube of a high pressure metal vapor lamp such as a high pressure mercury-vapor lamp will be illustrated.

Figure 2:
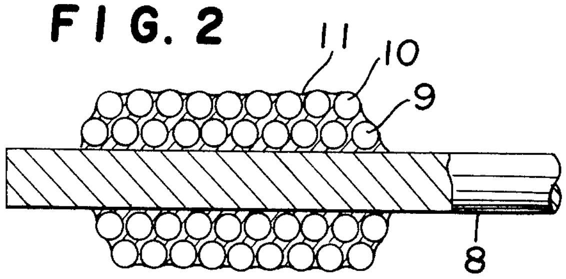
FIGS. 2 and 3 respectively enlarged sectional views of the electrode of the discharge lamp.

The reference numeral (1) designates an arc tube including mercury and argon gas for starting; (*2a*), (*2b*) respectively main electrodes disposed at both of ends of the arc tube under facing together, and the electrodes are respectively connected through each of molybdenum foils (*4a*), (*4b*) sealed at both ends of the arc tube (1) to electrical lead-in members (*6a*). The reference numeral (3) designates an auxiliary electrode connected through a molybdenum foil (5) to an electrical lead-in member (7) at one end of the arc tube (1) so as to easily start it. As shown in FIG. 2, the main electrodes (*2a*), (*2b*) respectively comprise a support rod (8) made of heat resistant metal such as tungsten, and an inner coil (9) and an outer coil (10) which are wound around the support rod, and an electron emission material (11) which is coated on the surface of the inner coil (9) and the outer coil (10) and adheres firmly by sintering (heating at a high temperature).

In order to compare the embodiment of the present invention, the conventional embodiment will be illustrated.

In the conventional embodiment, a tungsten rod having a diameter of 1.2 mm is used as the support rod and a tungsten wire having a diameter of 0.6 mm is used as the inner and outer coil (9), (10) to form the substrate of the electrode.

An electron emission material comprising 70 wt.% of barium oxide, 10 wt.% of calcium oxide and 20 wt.% of yttrium oxide, is mixed with nitrocellulose and butyl acetate in a ball mill for 24 hours to prepare a suspension. The substrate of the electrode is immersed in the suspension to coat the electron emission material on the inner coil (9) and the outer coil (10) and it is dried and heated at 1700° C. for 2 minutes in argon gas atmosphere and so electron emission material adheres to the substrate of the electrode.

The electrodes coated with the electron emission materials are used to prepare a 400 W high pressure mercury-vapor lamp having an arc tube (1) having an inner diameter of 18 mm and an arc length of 70 mm and including suitable amount of mercury and argon gas for starting.

The starting voltages at the environmental temperature of −10° C. before the life test of the lamp and after 6000 hours of operation, and the lumen maintenance after 6000 hours of operation are measured. The results are as follows:

| | |
|---|---|
| Starting voltage at −10° C before the life test | 166 Volt |
| Starting voltage at −10° C after 6000 hours of operation | 192 Volt |
| Lumen maintenance after 6000 hours of operation | 63 %. |

In the embodiment of the present invention, various electron emission materials comprising various contents of alkaline earth metal oxide (BaO.CaO) and yttrium oxide ($Y_2O_3$) and beryllium oxide (BeO) are respectively coated on the substrate of the electrodes in the same manner with that of the conventional one and the electrodes are used to prepare 400 W high pressure mercury vapor lamps. The same tests are repeated. The results are shown in Table 1.

Various electron emission materials comprising various contents of yttrium oxide ($Y_2O_3$) and beryllium oxide (BeO) with barium-strontium-calcium tungstate ($Ba_{1.8}Sr_{0.2}CaWO_6$) are respectively coated on the substrate of the electrodes in the same manner with that of the conventional one and the electrodes are used to prepare 400 W high pressure mercury vapor lamps.

The same tests are repeated. The results are shown in Table 2.

Table 1

| Test No. | Reference | 1 | 2 | 3 |
|---|---|---|---|---|
| Composition of electron emission material (wt. %) | | | | |
| BaO | 70 | 70 | 70 | 70 |
| CaO | 10 | 10 | 10 | 10 |
| $Y_2O_3$ | 20 | 18 | 16 | 15 |
| BeO | — | 2 | 4 | 5 |
| Starting voltage at −10° C before the life test [V] | 166 | 153 | 151 | 148 |
| Starting voltage after 6000 hours at −10° C [V] | 192 | 180 | 180 | 155 |
| Lumen maintenance after 6000 hours of operation [%] | 63 | 71 | 72 | 88 |
| Degree | | *N | *N | *G |

| Test No. | 4 | 5 | 6 | 7 |
|---|---|---|---|---|
| Composition of electron emission material (wt. %) | | | | |
| BaO | 70 | 70 | 70 | 70 |
| CaO | 10 | 10 | 10 | 10 |
| $Y_2O_3$ | 10 | 6 | 3 | 2 |
| BeO | 10 | 14 | 17 | 18 |
| Starting voltage at −10° C before the life test[V] | 144 | 142 | 141 | 142 |
| Starting voltage after 6000 hours at −10° C [V] | 148 | 146 | 144 | 144 |
| Lumen maintenance after 6000 hours of operation [%] | 89 | 74 | 74 | 67 |
| Degree | *E | *G | *G | *N |

| Test No. | 9 | 10 | 11 | 12 | 13 |
|---|---|---|---|---|---|
| Composition of electron emission material (wt. %) | | | | | |
| BaO | 35 | 35 | 35 | 35 | 30 |
| CaO | 15 | 15 | 15 | 15 | 10 |
| $Y_2O_3$ | 35 | 12 | 10 | 9 | 30 |
| BeO | 15 | 38 | 40 | 41 | 30 |
| Starting voltage at −10° C before the life test[V] | 159 | 147 | 141 | 141 | 170 |
| Starting voltage after 6000 hours at −10° C [V] | 180 | 148 | 143 | 149 | 178 |
| Lumen maintenance after 6000 hours of operation [%] | 76 | 86 | 75 | 64 | 75 |
| Degree | *G | *G | *G | *N | *N |

| Test No. | 14 | 15 | 16 |
|---|---|---|---|
| Composition of electron emission material (wt. %) | | | |
| BaO | 30 | 30 | 30 |
| CaO | 9 | 10 | 9 |
| $Y_2O_3$ | 30 | 25 | 26 |
| BeO | 31 | 35 | 35 |
| Starting voltage at −10° C before the life test [V] | 182 | 168 | 180 |
| Starting voltage after 6000 hours at −10° C [V] | 190 | 176 | 190 |
| Lumen maintenance after 6000 hours of operation [%] | 67 | 75 | 63 |
| Degree | *N | *G | *N |

Note:
*E: excellent
*G: good
*N: no good

Table 2

| Test No. | Reference | 17 | 18 | 19 |
|---|---|---|---|---|
| Composition of electron emission material [wt. %] | | | | |
| $Ba_{1.8}Sr_{0.2}CaWO_6$ | 70 | 70 | 70 | 70 |
| $Y_2O_3$ | 30 | 28 | 26 | 25 |
| BeO | — | 2 | 4 | 5 |
| Starting voltage at −10° C before the life test [V] | 162 | 159 | 150 | 146 |
| Starting voltage after 6000 hours at −10° C [V] | 198 | 188 | 180 | 154 |
| Lumen maintenance after 6000 hours of operation [%] | 64 | 72 | 72 | 81 |
| Degree | | *N | *N | *G |

| Test No. | 20 | 21 | 22 | 23 | 24 |
|---|---|---|---|---|---|
| Composition of electron emission material [wt. %] | | | | | |
| $Ba_{1.8}Sr_{0.2}CaWO_6$ | 70 | 70 | 70 | 70 | 56 |
| $Y_2O_3$ | 15 | 11 | 3 | 2 | 36 |
| BeO | 15 | 19 | 27 | 28 | 8 |
| Starting voltage at −10° C before the life test [V] | 138 | 135 | 134 | 132 | 160 |
| Starting voltage after 6000 hours at −10° C [V] | 141 | 137 | 135 | 134 | 190 |
| Lumen maintenance after 6000 hours of 91 operation [%] | 90 | 79 | 68 | 67 | |
| Degree | *E | *E | *G | *N | *N |

| Test No. | 25 | 26 | 27 | 28 | 29 |
|---|---|---|---|---|---|
| Composition of electron emission material [wt. %] | | | | | |
| $Ba_{1.8}Sr_{0.2}CaWO_6$ | 56 | 56 | 56 | 56 | 40 |
| $Y_2O_3$ | 35 | 22 | 14 | 15 | 30 |
| BeO | 9 | 32 | 40 | 41 | 30 |
| Starting voltage at −10° C before the life test [V] | 152 | 146 | 137 | 137 | 170 |
| Starting voltage after 6000 hours at −10° C [V] | 175 | 140 | 139 | 150 | 178 |
| Lumen maintenance after 6000 hours of operation [%] | 76 | 86 | 75 | 60 | 75 |
| Degree | *G | *G | *G | *N | *G |

| Test No. | 30 | 31 | 32 |
|---|---|---|---|
| Composition of electron emission material [wt. %] | | | |
| $Ba_{1.8}Sr_{0.2}CaWO_6$ | 39 | 80 | 80 |
| $Y_2O_3$ | 31 | 10 | 7 |
| BeO | 30 | 10 | 13 |
| Starting voltage at −10° C before the life test [V] | 180 | 135 | 130 |
| Starting voltage after 6000 hours at −10° C [V] | 195 | 140 | 135 |
| Lumen maintenance after 6000 hours of operation [%] | 62 | 85 | 87 |
| Degree | *N | *G | *G |

Note:
*E: excellent
*G: good
*N: no good

In Tables 1 and 2, the degree is decided under the consideration of the starting voltage before the life test, the starting voltage after 6000 hours of operation and the lumen maintenance after 6000 hours of operation (usually more than 73% is required) on the bases of the results of References 1 and 2. The remarkable improvement of the effects is rated as excellent (E) and the slight improvement of the effects is rated as good (G) and no improvement of the effects is rated as no good (N).

The following fact is found by the test results. When the content of beryllium oxide is increased in the electron emission material, the adhesion of the electron emission material on the substrate of the electrode is improved. That is, yttrium oxide and beryllium oxide form a solid solution to decrease the melting point of the electron emission material when the electron emission material is heated to adhere on the substrate of the electrode. As the result, the electron emission material is uniformly spread on the surface of the substrate of the electrode so as to form the electron emission material having remarkably high adhesion, whereby the electron emission material is not peeled off. The solid solution covers fine crystals of alkaline earth metal oxides whereby the formation of free barium can be moderately controlled during the life of the lamp and the supply of the barium to the top of the electrode can be maintained in suitable degree. Accordingly, the starting characteristics and the lumen maintenance of the lamp are excellent.

When the content beryllium oxide is too high, the evaporation of the electron emission material during operation is sometimes increased. Accordingly, it is necessary to maintain the content of beryllium oxide in a range of 5 to 40 wt.%.

When the content of yttrium oxide is too low, the evaporation of the electron emission material is much great whereby the lumen output decreases at a high rate. On the other hand, when the content of yttrium oxide is too high, the electron emission material easily comes off from the electrode and this cause the rise of the starting voltage during operation. Accordingly, it is necessary to maintain the content of yttrium oxide in a range of 3 to 35 wt.%.

When the total content of beryllium oxide and yttrium oxide in the electron emission material is more than 60 wt.%, the starting voltage before the life test is remarkably high and it could not be practically used.

When barium-strontium-calcium tungstate ($Ba_{1.8}Sr_{0.2}CaWO_6$) is used instead of the alkaline earth oxides, the following characteristics could be imparted together with the above-mentioned characteristics. That is, the component of $Ba_{1.8}Sr_{0.2}CaWO_6$ is dispersed into the solid solution of beryllium oxide and yttrium oxide whereby the free barium is gradually supply to the top of the electrode during the operation of the discharge lamp. Accordingly, the operation of the electrode is more stable for a long time.

In Tables 1 and 2, the embodiments of the addition of the components of $Y_2O_3$ and BeO to the component of BaO-CaO or $Ba_{1.8}Sr_{0.2}CaWO_6$ are shown. The present invention can be also applied to add the components of $Y_2O_3$ and BeO to the component of BaO, BaO-SrO-CaO or $Ba_2CaWO_6$, etc.

In the embodiment, the alkaline earth metal oxide used in the electron emission material is prepared by heating the alkaline earth carbonate in air at high temperature. However, the raw material is not limited to the carbonates but it can be various compounds which can be converted to the corresponding oxides by heating at high temperature such as oxalic acid and hydroxides.

In the embodiments, the electron emission material comprising the alkaline earth metal oxide and yttrium oxide and beryllium oxide is mixed with nitrocellulose and butyl acetate to form the suspensions and the suspension is coated on the substrate of the electrode and the electron emission material is adhered on the surface of the substrate of the electrode by heating it at a high temperature to prepare the electrodes.

However, when the compound which can be converted to the oxide by heating it at a high temperature such as an alkaline earth carbonate is mixed with yttrium oxide and beryllium oxide, nitrocellulose and butyl acetate to form a suspension and the suspension is coated on the substrate of the electrode and it is heated at a high temperature, whereby the alkaline earth metal carbonate is converted to the corresponding oxide and the electron emission material formed on the substrate of the electrode can work satisfactorily as well as those of the embodiments.

The barium-strontium-calcium tungstate $Ba_{1.8}Sr_{0.2}CaWO_6$ is prepared by mixing suitable amounts of barium carbonate, strontium carbonate, calcium carbonate and tungsten trioxide and sintering the mixture at 1400° C. for 30 minutes, and it can be also prepared by mixing barium oxide, strontium oxide, calcium oxide and tungsten powder and sintering the mixture at high temperature, etc.

In the above embodiments, $Ba_{1.8}Sr_{0.2}CaWO_6$ is previously prepared and then, yttrium oxide, beryllium oxide are mixed with it. However, the alkaline earth metal (Ba, Sr and Ca) carbonates or oxalates is mixed with tungsten oxide, yttrium oxide and beryllium oxide to form a suspension and then the suspension is coated on the substrate of the electrode and is heated at a high temperature whereby the reaction of the carbonates with tungsten oxide is performed to obtain the tungstate such as $Ba_{1.8}Sr_{0.2}CaWO_6$. The electron emission material having the same formula can be obtained by these methods.

Figure 3:
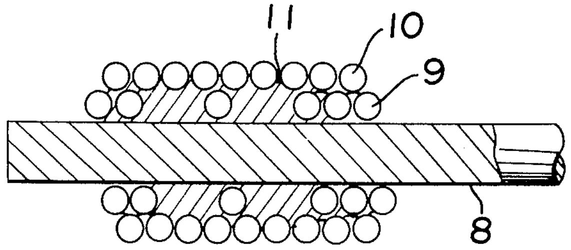

In the above-mentioned embodiments, the electrode having the structure of FIG. 2 is described. However, the structure of the electrode is not limited to it and can be the other various structures for example, such as shown in FIG. 3, wherein the support rod (8) is wound by the inner coil (9) having roughly wound spaces and is also wound by the outer coil (10) and the electron emission material (11) is filled in the spaces between them.

In accordance with the present invention, the electron emission material comprising both of beryllium oxide and yttrium oxide is applied to the substrate of the electrode, whereby beryllium oxide and yttrium oxide form the solid solution to decrease the melting point of the electron emission material and the electron emission material is uniformly coated to form the electron emission material layer having remarkably high adhesion force, and the electron emission material is not peeled off. Accordingly, the discharge lamp having excellent starting characteristics and excellent lumen maintenance and deterioration and having long lamplife can be advantageously obtained.

What is claimed is:

1. An electrode of a discharge lamp which comprises an electron emission material containing 5–40 wt.% beryllium oxide and 3–35 wt.% yttrium oxide with one or more of barium calcium and strontium components which is coated on a substrate of the electrode wherein the electron emission material comprises less than 60 wt.% of total content of beryllium oxide and yttrium oxide.

2. An electrode according to claim 1 wherein the electron emission material further comprises barium oxide and one or more of calcium oxide and strontium oxide.

3. An electrode of a discharge lamp which comprises an electron emission material containing barium-strontium-calcium tungstate ($Ba_{2-x}Sr_xCaWo_6$; x is 0 to 0.5) and 5–40 wt.% beryllium oxide and 3–35 wt.% yttrium oxide wherein the electron emission material comprises less than 60 wt.% of total content of beryllium oxide and yttrium oxide.

4. An electrode of a discharge lamp which comprises an electron emission material containing 5–40 wt.% beryllium oxide and 3–35 wt.% yttrium oxide with one or more of barium, calcium and strontium components and further containing tungsten powder or tungsten oxide powder which is coated on a substrate of the electrode, wherein the electron emission material comprises less than 60 wt.% of the total content of beryllium oxide and yttrium oxide.

* * * * *